United States Patent [19]

Sivacoe

[11] Patent Number: 5,318,074
[45] Date of Patent: Jun. 7, 1994

[54] PLUG FOR A FURNACE HEADER

[76] Inventor: Orlande Sivacoe, #601, 4700 - 55 Street, Red Deer, Alberta, Canada, T4N 2H8

[21] Appl. No.: 921,114

[22] Filed: Jul. 29, 1992

[51] Int. Cl.$^5$ .............................. F16L 55/10
[52] U.S. Cl. .................... 138/89; 138/96 R
[58] Field of Search .......... 138/89, 90, 96 R, 96 T; 220/213

[56] References Cited

U.S. PATENT DOCUMENTS

| | | | |
|---|---|---|---|
| 2,362,675 | 11/1944 | Sterbins | 138/89 |
| 2,818,086 | 12/1957 | Foth | 138/89 |
| 3,083,735 | 4/1963 | Clark | 138/89 |
| 3,156,373 | 11/1964 | Willis | 138/89 |
| 4,958,743 | 9/1990 | Hatton et al. | 138/89 |

*Primary Examiner*—Timothy F. Simone
*Assistant Examiner*—Patrick F. Brinson
*Attorney, Agent, or Firm*—Anthony R. Lambert

[57] ABSTRACT

A plug for a furnace header having a pair of pipe continuations formed within the furnace header. Each pipe continuation terminates at an opening having a conical interior surface and is connected to the other by a pipe extending between them. The plug has a conical portion for engaging the conical interior surface on the furnace header to seal off the pipe. The plug also includes a portion having a generally concave arcuate surface forming a 90° bend in a plane that bisects both of the pipe continuations and whose edges conform to the internal dimensions of the furnace header adjacent the opening. A locking mechanism secures the plug within the furnace header.

2 Claims, 3 Drawing Sheets

PLUG FOR A FURNACE HEADER

FIELD OF THE INVENTION

This invention relates to furnace headers and in particular to plugs for furnace headers.

BACKGROUND OF THE INVENTION

Furnaces and similar apparatus include pipes that carry hot gases and/or liquids. These gases or liquids usually carry some proportion of unwanted contaminants that eventually become attached to the insides of the pipes and begin to clog them.

When the pipes are cleaned, access to the pipes is often carried out through a furnace header that is located at the end of two or more pipes. Gas or liquid flow through the two or more pipes is from one and into the other or others. The cleaning of such pipes has previously typically required the insertion of a cable with a cleaning device attached to one end that is moved through the pipes to clean them, rather like a chimney sweep. The cleaning device may use high pressure jets. The cable and cleaning device access the pipes through the furnace header which provides an opening for each pipe. Plugs are used to seal off the furnace headers when they are not being used to clean the pipes.

The inventor has begun cleaning pipes in furnaces and such like using an elastic, cylindrical device with sharp spines, known as a pig. The pig fits snugly within the pipe and is forced through the furnace under fluid pressure. The elasticity of the pig allows it to pass around 180° bends. Commonly used furnace headers have formed an insurmountable barrier for these pigs. The invention has therefore designed a plug for a furnace header that includes a generally concave arcuate surface forming a 90° bend whose edges merge with the internal dimensions of the furnace header to allow the pig to pass from one pipe in the furnace header to the other. Further description of the invention is found in the description following and the claims.

BRIEF DESCRIPTION OF THE DRAWINGS

There will now be described a preferred embodiment of the invention, with reference to the drawings, by way of illustration, in which like numerals denote like elements and in which.

DETAILED DESCRIPTION OF PREFERRED EMBODIMENTS

Figure 1:
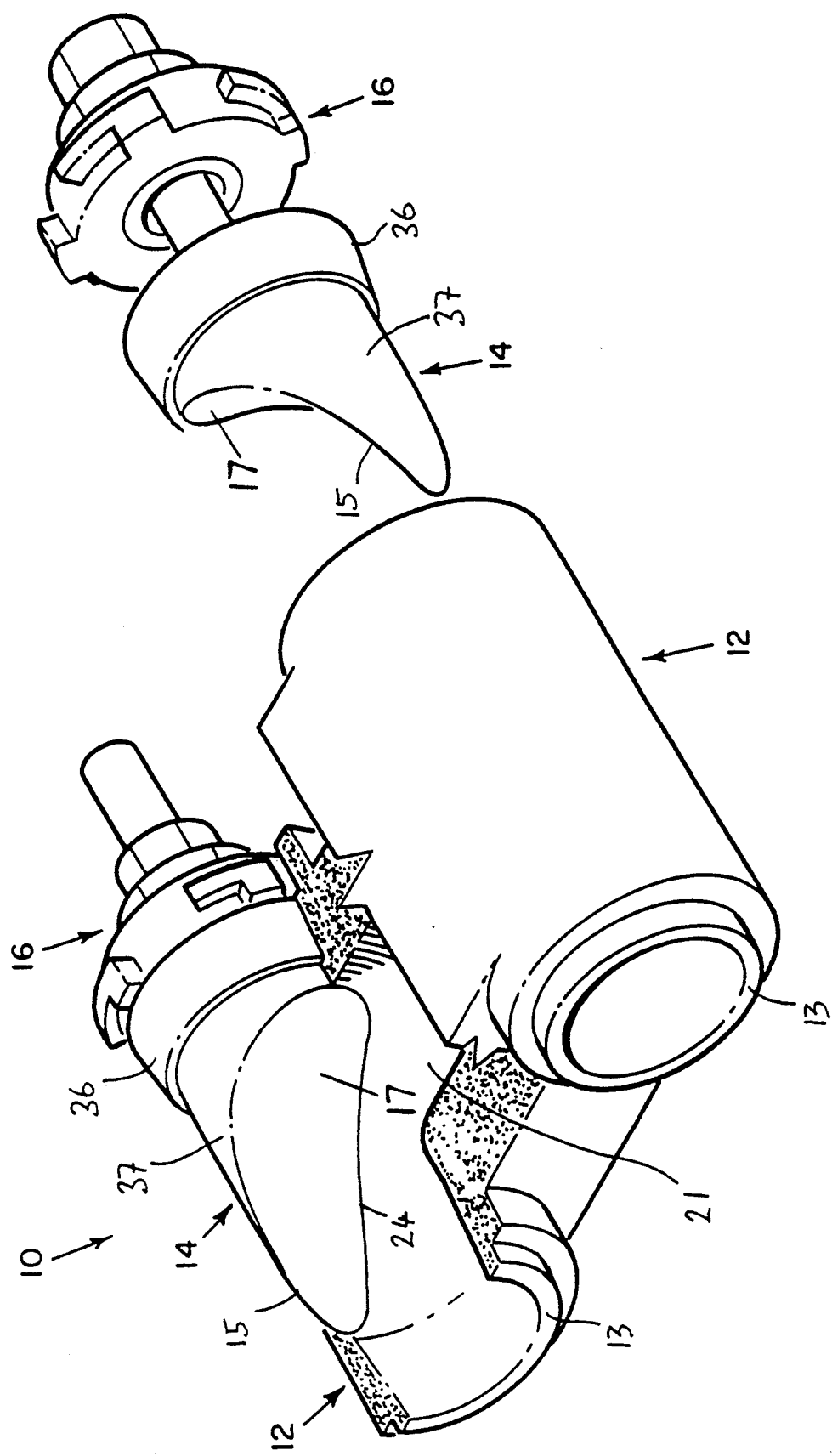
FIG. 1 is a perspective of a furnace header and two plugs according to the invention.
Figure 2:
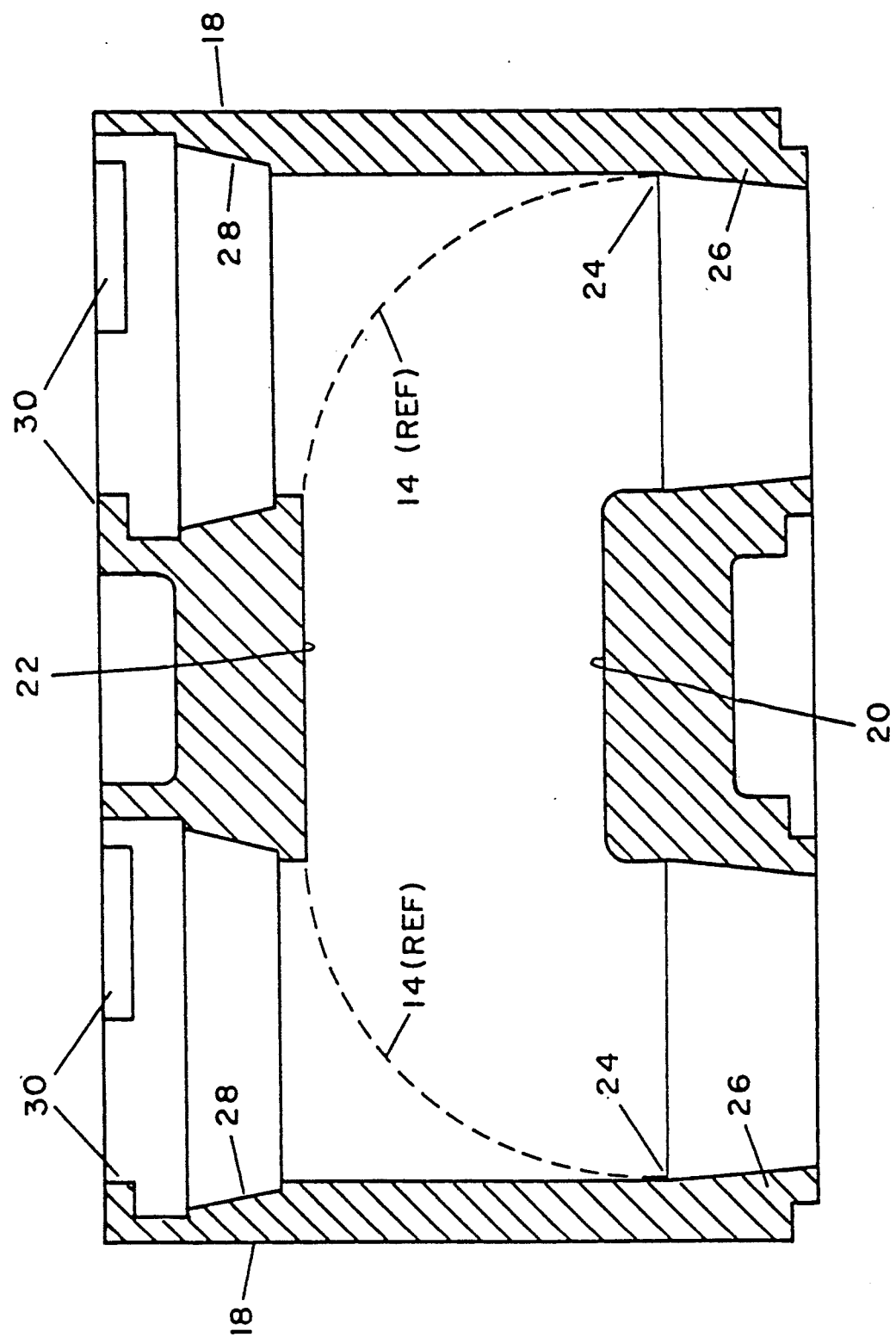
FIG. 2 is a section through the furnace header shown in FIG. 1.
Figure 3:
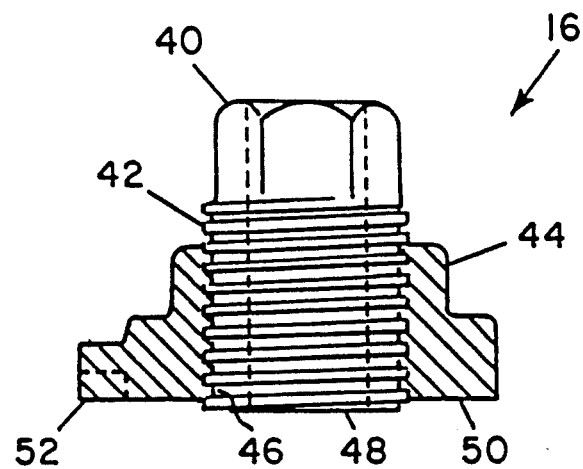
FIG. 3 shows a nut for securing the plug in the furnace header.
Figure 4:
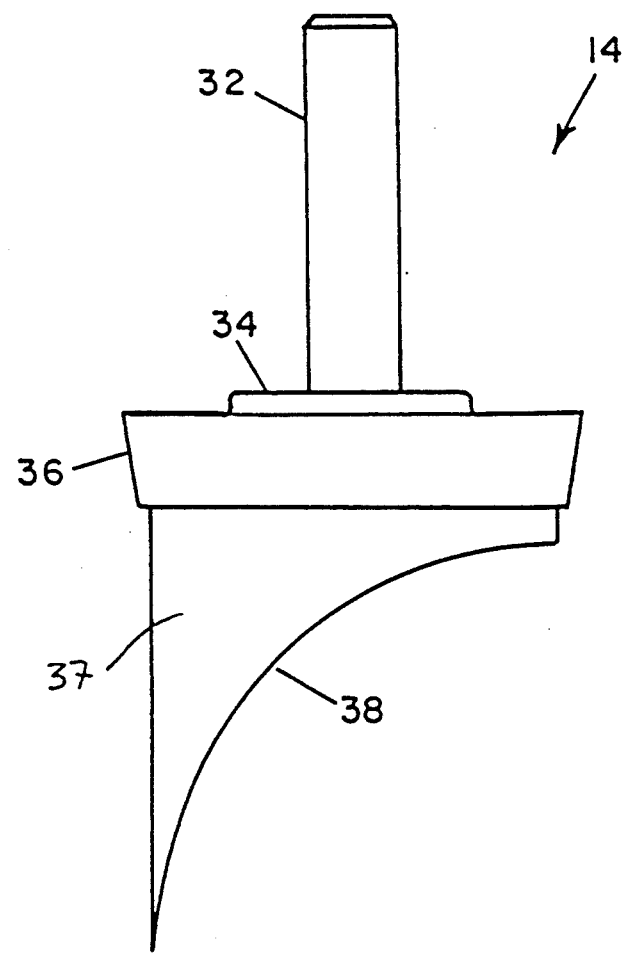
FIG. 4 is a section through a plug for a furnace header according to the invention.

A furnace header 10 of conventional construction is shown in FIGS. 1 and 2 having a pair of pipe connector flanges 13 formed integrally with the body 12 of the header. Pipes (not shown) are normally attached to the pipe connector flanges 13 in known manner. The interior walls 26 of the body 12 are cylindrical and function to provide continuations 18 of the pipes that terminate at openings having a conical interior surface 28. The interior walls 20 and 22 of the furnace header also form a pipe 21 perpendicular to and connecting the continuations 18.

A plug 14 for the furnace header 10 made in accordance with the invention includes a conical portion 36 for engaging the conical interior surface 28 on the furnace header to seal off the pipe when the plug 14 is engaged with the furnace header. The plug 14 also includes a generally wedge shaped portion 37 integral with the conical portion 36 and having a generally concave smooth arcuate surface 38 forming a 90° bend in a plane that bisects both of the pipe continuations and having a leading edge 15 that conforms to the pipe continuation interior wall opposite to the pipe connector and a trailing edge 17 that conforms to the pipe continuation interior wall to form a gradual transition between the pipe continuation and the pipe connector. Smooth means sufficiently smooth that a pig will not catch on the plug. The edges 15 and 17 of the portions 37 therefore conform to the internal dimensions of the furnace header as shown at 24 and merge with the interior wall 22 adjacent the openings. The arcuate surface 38 preferably has the shape of the interior wall of a pipe at the outside of a U-shaped bend. The plugs 14 together with the pipe continuations 18 and the pipe 21 form a U-shaped bend.

Securing means 16 (known in the art as a screw type) of conventional construction are provided to secure the plug within the furnace header. The securing means 16 is formed from flange 44 and nut 40. Flange 44 is internally threaded as shown at 46 and nut 40 is correspondingly externally threaded as shown at 42. Portions of the front face 50 of the flange 44 are cut away to allow a twist lock with the faces 30 on the furnace header. Other equivalent means for securing the plug within the header are the horseshoe type and the mule ears type, both well known in the art.

The interior walls 26 of the furnace header at the inlet to the header adjacent the pipe connector flanges 13 are tapered to allow expansion of a pig in the furnace header and to assist in preventing the pig from catching on the edges 15 of the plugs 14.

To operate the securing means, the plug 14 is inserted into the furnace header and rotated until the faces 30 mate with the slots 52. The nut is then tightened so that the face 48 on the nut 40 presses against the face 34 on the plug. This tends to make the flange move outward away from the furnace header and the faces 30 press against the interior of the slots 52 thus securing the plug in place.

When a pig is being run in the furnace, the pig will enter one of the pipe continuations 18, press against the interior surface 38 of one of the plugs 14, be guided by the interior surface 38 into the pipe 21, press against the interior surface 38 of the other of the plugs 14, be guided by that interior surface into the pipe continuation 18 and thence into the pipe on the other side of the furnace header. This operation may also evidently be run in reverse since the furnace header is symmetrical. In the case when the furnace header has several outlets and one inlet, the outlet being used is fitted with a plug in accordance with the invention and any pipes intermediate the inlet pipe and the outlet pipe are sealed or blocked off, such as with expandable jaws wedged in the pipe, so that the pig cannot enter the pipe and will continue on to be deflected by the plug in the pipe continuation of interest.

Alternative Embodiments

A person skilled in the art could make immaterial modifications to the invention described and claimed in this patent without departing from the essence of the invention.

I claim:

1. A plug for a furnace header having a pair of pipe continuations formed within the furnace header, each pipe continuation being defined by a pipe continuation interior wall and terminating at an opening having a conical interior surface, the pipe continuations being connected by a connector pipe extending between them, the connector pipe being defined by a pipe connector interior wall, the plug comprising:

a conical portion for engaging the conical interior surface on the furnace header to seal off the pipe;

a generally wedge shaped portion integral with the conical portion and having a generally concave smooth arcuate surface forming a 90° bend in a plane that bisects both of the pipe continuations and having a leading edge that conforms to the pipe continuation interior wall opposite to the pipe connector and a trailing edge that merges with the pipe connector interior wall to form a gradual transition between the pipe continuation and the pipe connector; and means to secure the plug within the furnace header.

2. A furnace header comprising:

a pair of pipe continuations formed within the furnace header, each pipe continuation terminating at an opening having a conical interior surface and being defined by a pipe continuation interior wall;

a pipe connector extending between the pipe continuations and being defined by a pipe connector interior wall;

a plug for each opening including a bevelled portion for engaging the conical interior surface on the furnace header to seal off the respective pipe continuations;

each plug having a generally wedge shaped portion integral with the conical portion and having a generally concave smooth arcuate surface forming a 90° bend in a plane that bisects both of the pipe continuations and having a leading edge that conforms to a pipe continuation interior wall opposite to the pipe connector and a trailing edge that merges with the pipe connector interior wall to form a gradual transition between the pipe continuation and the pipe connector; and means to secure each plug within the furnace header.

* * * * *